(12) United States Patent
Schlag et al.

(10) Patent No.: US 8,100,284 B2
(45) Date of Patent: Jan. 24, 2012

(54) CRYOGENIC STORAGE TANK WITH THERMAL SHIELD

(75) Inventors: Harald Schlag, Ruesselsheim (DE); Rainer Immel, Dexheim (DE)

(73) Assignee: GM Global Technology Opertions LLC, Detroit, MI (US)

( * ) Notice: Subject to any disclaimer, the term of this patent is extended or adjusted under 35 U.S.C. 154(b) by 668 days.

(21) Appl. No.: 11/675,955

(22) Filed: Feb. 16, 2007

(65) Prior Publication Data

US 2008/0197137 A1  Aug. 21, 2008

(51) Int. Cl.
    *F17C 1/00* (2006.01)
(52) U.S. Cl. .................... 220/560.12; 206/0.6
(58) Field of Classification Search .......... 220/587, 220/586, 583, 581, 560.12, 560.04, 560.14, 220/560.1; 206/0.6; 123/41.14; 62/45.1, 62/50.7, 51.1, 50.1
    See application file for complete search history.

(56) References Cited

U.S. PATENT DOCUMENTS

| | | | | |
|---|---|---|---|---|
| 3,433,384 A | * | 3/1969 | Caruthers, Jr. et al. | 220/560.1 |
| 3,728,187 A | * | 4/1973 | Martin | 156/162 |
| 3,762,175 A | * | 10/1973 | Jones | 62/45.1 |
| 4,011,963 A | * | 3/1977 | Cheng et al. | 220/560.12 |
| 4,711,703 A | * | 12/1987 | Wright et al. | 205/782.5 |
| 4,925,046 A | * | 5/1990 | Sharp | 220/4.12 |
| 5,651,473 A | * | 7/1997 | Preston et al. | 220/560.1 |
| 6,634,519 B2 | * | 10/2003 | Pelloux-Gervais et al. | 220/560.1 |
| 7,036,323 B2 | * | 5/2006 | Schnagl | 62/45.1 |
| 7,195,035 B2 | | 3/2007 | Pechtold | |
| 7,293,418 B2 | * | 11/2007 | Noble et al. | 62/50.6 |
| 7,344,045 B2 | * | 3/2008 | Harper et al. | 220/560.09 |
| 2004/0209150 A1 | | 10/2004 | Rock et al. | |
| 2006/0068993 A1 | * | 3/2006 | Egan | 505/211 |
| 2006/0096302 A1 | | 5/2006 | Pechtold | |
| 2006/0196876 A1 | * | 9/2006 | Rohwer | 220/560.12 |
| 2006/0230679 A1 | | 10/2006 | Matos Da Silva et al. | |
| 2007/0068247 A1 | | 3/2007 | Da Silva et al. | |
| 2007/0068954 A1 | * | 3/2007 | Immel et al. | 220/560.1 |
| 2007/0199941 A1 | * | 8/2007 | Reese | 220/560.1 |

* cited by examiner

*Primary Examiner* — Jacob K Ackun
*Assistant Examiner* — Kareen Rush
(74) *Attorney, Agent, or Firm* — Fraser Clemens Martin & Miller LLC; J. Douglas Miller

(57) ABSTRACT

A cryogenic fluid storage tank having an inlet conduit, an outlet conduit, and a thermal shield in thermal contact with the inner vessel is disclosed, wherein the thermal shield is adapted to militate against heat transfer from the atmosphere to a cryogenic fluid by the inlet conduit and the outlet conduit.

24 Claims, 3 Drawing Sheets

CRYOGENIC STORAGE TANK WITH THERMAL SHIELD

FIELD OF THE INVENTION

The invention relates generally to a cryogenic storage tank, and more particularly, to a cryogenic storage tank including a thermal shield that minimizes heat transfer to the cryogenic fluid originating from inlet and outlet conduits.

BACKGROUND OF THE INVENTION

Electric vehicles and internal combustion engine powered vehicles may be powered by a number of different fuels. Internal combustion engine powered vehicles may be powered by various fuels including gasoline, diesel, ethanol, methane, or hydrogen, for example. Fuel cells have been proposed as a power source for electric vehicles, and other applications. Such a fuel cell system is disclosed in commonly owned U.S. patent application Ser. No. 10/418,536, hereby incorporated herein by reference in its entirety. In proton exchange membrane (PEM) type fuel cells, hydrogen is supplied as a fuel to an anode of the fuel cell and oxygen is supplied as an oxidant to a cathode of the fuel cell. A common technique for storing large quantities of hydrogen is to cool and compress hydrogen via liquefaction techniques, and to store the liquid phase hydrogen in a cryogenic storage tank. Hydrogen gas liquefies at −253° C. and can be stored at about 70 g/L in the liquid phase. The amount of energy required to cool down hydrogen gas into a liquid is very high, and currently may use as much as 40% of the energy obtained from the hydrogen fuel. Thus, it is advantageous to keep the liquid phase hydrogen insulated to militate against liquid evaporation.

Any transfer of heat to the innermost portion of the cryogenic storage tank affects the natural evaporation rate of the cryogenic vessel. The more heat that is transferred, the faster the rate of boil-off of the liquid hydrogen, or the higher the natural evaporation rate. In order to maintain the hydrogen in a liquid state, heat transfer from the ambient environment to the cryogenic liquid must be kept to a minimum. Cryogenic storage tanks generally consist of an inner storage vessel encapsulated with an outer vessel or shell. The space between the inner vessel and the outer vessel is commonly well insulated and maintained under a vacuum. An interior of the inner vessel, however, must include fluid communication means, typically in the form of inlet and outlet conduits, for the filling and extraction of liquid and gaseous hydrogen.

A typical storage tank includes a liquid inlet conduit, a liquid outlet conduit, and an inlet and outlet gas conduit. The liquid inlet conduit and the liquid outlet are sometimes combined into a single conduit. Further, additional conduits are sometimes included to provide a path for cables to sensors or heaters that may be included in the inner vessel. The three conduits typically penetrate a sidewall of the storage tank through three separate apertures, or together in a common vacuum tube penetrating the sidewall of the inner vessel. At least a portion of each conduit is exposed to the ambient environment. The conduits bridge an insulation that is present between the inner vessel and the outer vessel, and allow parasitic heat from the ambient environment to transfer into the inner vessel.

The use of a vacuum tube is a typical method employed to mitigate the heat transfer from the ambient environment to the inner vessel. A vacuum tube is provided that extends into the inner vessel creating a tubular cavity. The inlet and outlet conduits pass through the vacuum tube before penetrating the inner vessel. The cavity in the vacuum tube is maintained colder than the inlet and outlet conduits contained therein. The colder temperature in the cavity cools the inlet and outlet conduits, and reduces the heat transfer by the inlet and outlet conduits from the ambient environment into the inner vessel.

The use of the vacuum tube has some shortcomings. The vacuum tube reduces a storage volume of the inner vessel. Further, testing the inner vessel for vacuum tightness once welded closed is difficult and any repairs to welds or conduits at a far end of the vacuum tube are not possible. Accordingly, there is a need for an improved cryogenic liquid storage tank and particularly, one that minimizes heat transfer originating from the inlet and outlet conduits and maximizes the storage volume and serviceability of the inner vessel.

It would be desirable to develop a cryogenic storage tank with a minimized heat transfer originating from the inlet and outlet conduits and maximized storage volume and serviceability of the inner vessel.

SUMMARY OF THE INVENTION

Compatible and attuned with the present invention, a cryogenic storage tank with a minimized heat transfer originating from the inlet and outlet conduits and maximized storage volume and serviceability of the inner vessel, has surprisingly been discovered.

In one embodiment, the cryogenic fluid storage tank comprises a tank having an outer wall and adapted to store a cryogenic fluid; a first conduit penetrating the tank at a penetration point; and a thermal shield disposed adjacent the penetration point of the first conduit to thermally shield the conduit from ambient temperatures.

In another embodiment, the cryogenic fluid storage tank comprises a dual wall tank having an inner tank wall, an outer tank wall, and an interstitial space formed therebetween; a first conduit penetrating the outer wall and the inner wall of the tank; and a thermal shield disposed in the interstitial space to thermally shield the conduit.

In another embodiment, the cryogenic fluid storage tank comprises an outer vessel; an inner vessel disposed in the outer vessel forming an interstitial space therebetween, the inner vessel and the outer vessel cooperating to store a cryogenic fluid; a first conduit penetrating the outer wall and the inner wall of the tank, the first conduit adapted to vent and extract a gas from the tank; a second conduit penetrating the outer wall and the inner wall of the tank, the second conduit adapted to supply the cryogenic liquid to the tank; a third conduit penetrating the outer wall and the inner wall of the tank, the third conduit adapted to extract the cryogenic liquid from the tank; and a thermal shield disposed in the interstitial space between the first, second, and third conduits and the outer vessel to thermally shield the first, second, and third conduits.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3b is an alternate embodiment of the thermal shield shown in FIG. 3a;

FIG. 3c is an alternate embodiment of the thermal shield shown in FIG. 3a; and

FIG. 3d is an alternate embodiment of the thermal shield shown in FIG. 3a.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
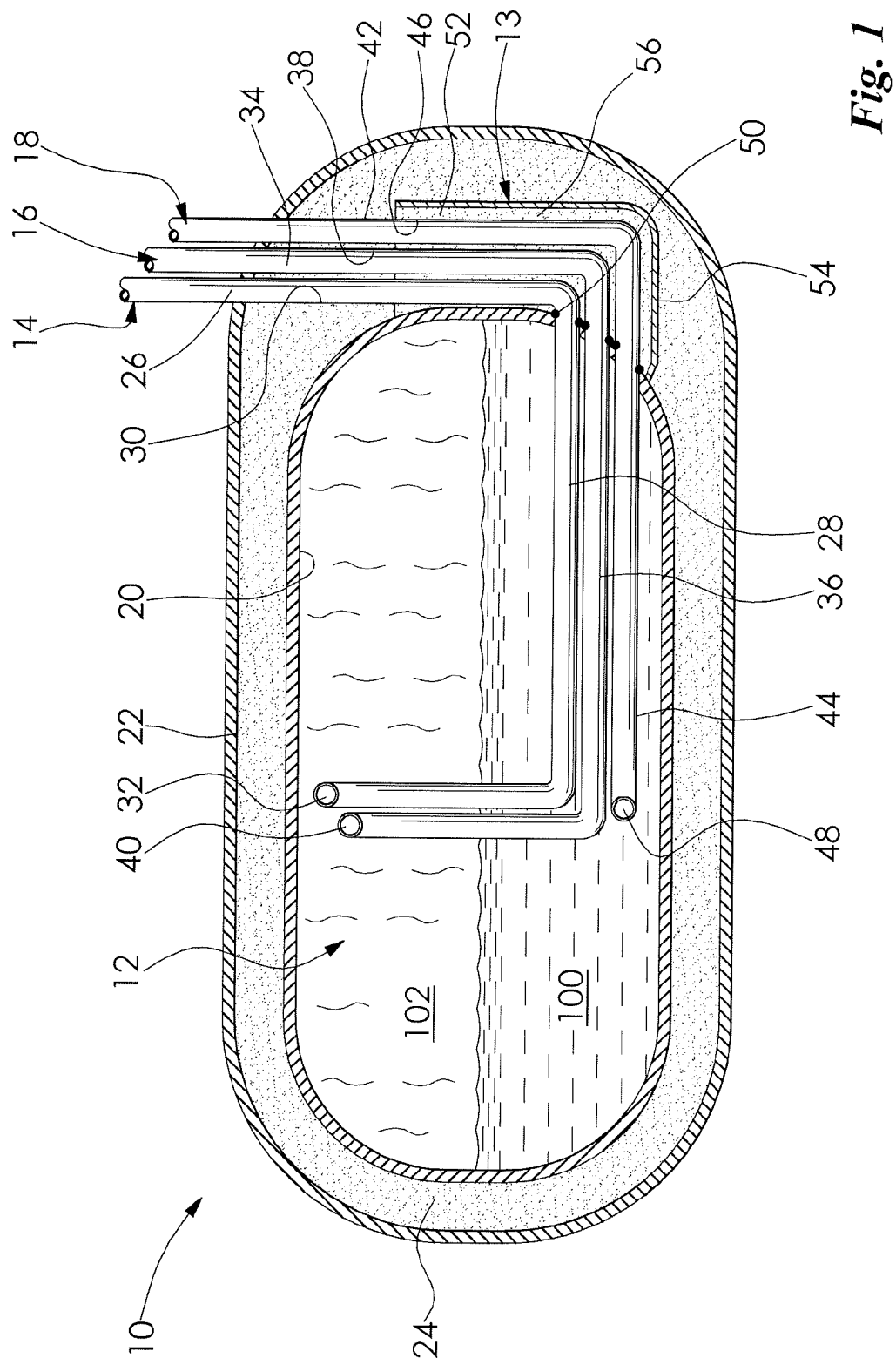
FIG. 1 is a sectional side view of a cryogenic storage tank according to an embodiment of the invention.
Figure 2:
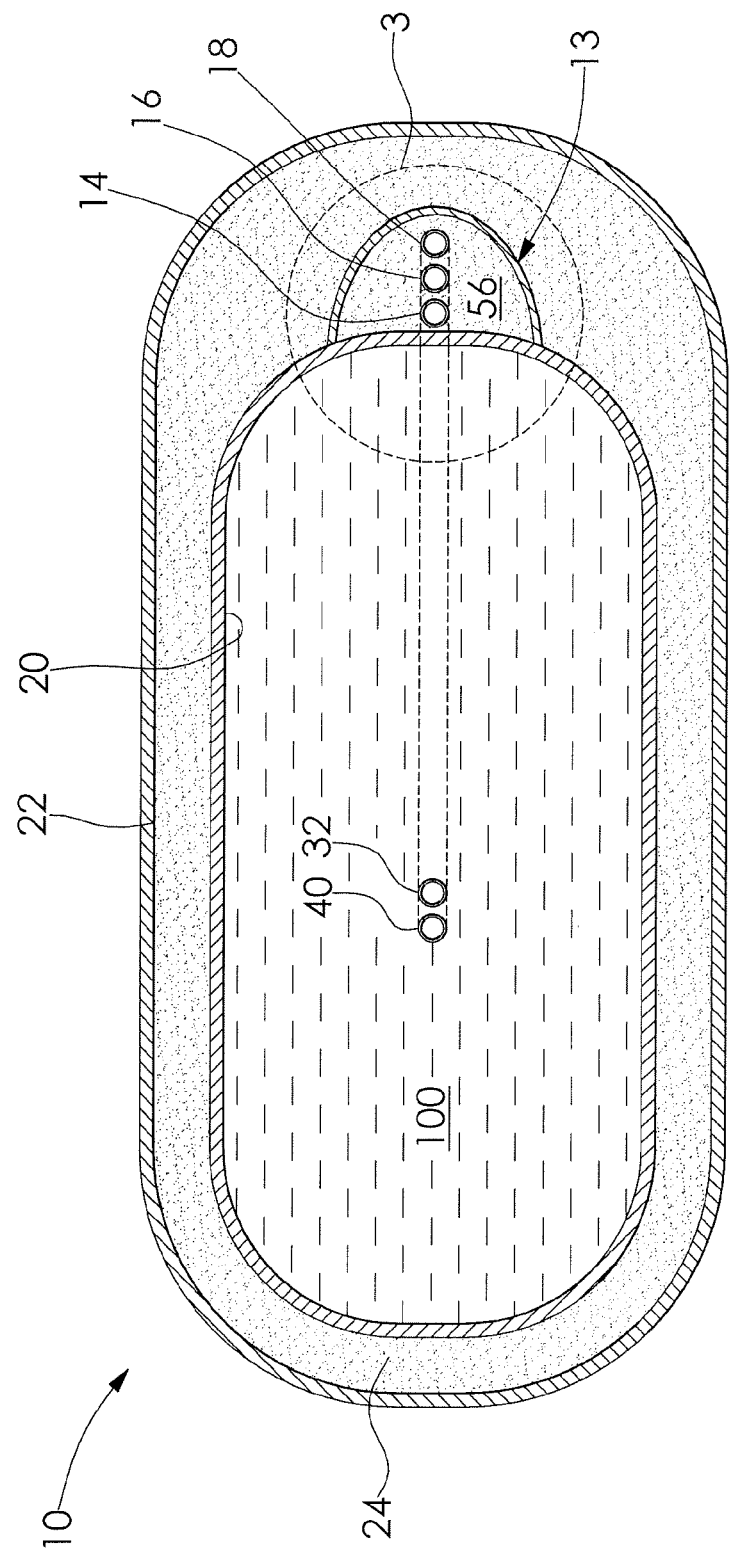
FIG. 2 is a sectional top view of the cryogenic storage tank shown in FIG. 1.

FIGS. 1 and 2 show a cryogenic fluid storage tank 10 according to an embodiment of the invention. The storage tank 10 includes a reservoir 12, a first conduit 14, a second conduit 16, a third conduit 18, and a thermal shield 13. An inner vessel 20 forms the reservoir 12. The inner vessel 20 is disposed in an outer vessel 22 forming an interstitial space therebetween. The space between the inner vessel 20 and the outer vessel 22 is filled with a multi-layered thermal vacuum insulation 24. It is understood that the space between the inner vessel 20 and outer vessel 22 may be filled with any insulation, as desired, or the space can remain empty. It is also understood that the cryogenic fluid may be any fluid such as hydrogen, oxygen, nitrogen, argon, neon, krypton, xenon, and helium or compounds thereof, for example, as desired.

In the embodiment shown, the first conduit 14 includes a first portion 26 and a second portion 28. The first conduit 14 extends through a first penetration 30 of the storage tank 10 to provide fluid communication between the reservoir 12 and a consumer of cryogenic fluid (not shown) such as a fuel cell stack, an internal combustion engine, or a waste tank, as desired. The first penetration 30 is formed by a series of apertures in the outer vessel 22, insulation 24, and inner vessel 20 that provide a channel adapted to receive a portion of the first conduit 14. The first portion 26 includes an outlet (not shown) formed at a distal end thereof. The second portion 28 is substantially L-shaped and includes an aperture 32 adapted to be an inlet. The aperture 32 is disposed substantially near a top of the storage tank 10, above a cryogenic liquid 100 and in a gas 102. It is understood that the second portion 28 may be curvilinear, helical, and otherwise shaped, as desired.

The second conduit 16 includes a first portion 34 and a second portion 36. The second conduit 16 extends through a second penetration 38 of the storage tank 10 to provide fluid communication between the reservoir 12 and a source of cryogenic fluid (not shown) such as a refueling source, another source of liquid, or a source of gas, as desired. The second penetration 38 is formed by a series of apertures in the outer vessel 22, insulation 24, and inner vessel 20 that provide a channel adapted to receive a portion of the second conduit 16. The first portion includes an inlet (not shown) formed at a distal end thereof. The second portion 34 is substantially L-shaped and includes an aperture 40 adapted to be an outlet. The aperture 40 is disposed substantially near a top of the storage tank 10, above the cryogenic liquid 100 and in the gas 102. It is understood that the second portion 36 may be curvilinear, helical, and otherwise shaped, as desired.

The third conduit 18 includes a first portion 42 and a second portion 44. The third conduit 18 extends through a third penetration 46 of the storage tank 10 to provide fluid communication between the reservoir 12 and the consumer of cryogenic fluid. The third penetration 46 is formed by a series of apertures in the outer vessel 22, insulation 24, and inner vessel 20 that provide a channel adapted to receive a portion of the third conduit 18. It is understood that the first penetration 30, the second penetration 38, and the third penetration 46 can be formed as a single penetration adapted to receive the first conduit 14, the second conduit 16, and the third conduit 18. The second portion 44 is substantially linear and includes an aperture 48 adapted to be an inlet. The aperture 48 is disposed substantially near a bottom of the storage tank 10, below the gas 102 and in the cryogenic liquid 100. It is also understood that the second portion 44 may be curvilinear, helical, and otherwise shaped, as desired.

Each conduit 14, 16, 18 is oriented to penetrate the storage tank 10 near a top surface of the outer vessel 22 and extend downwardly through the insulation 24. The conduits 14, 16, 18 are adapted to penetrate the inner vessel 20 near the bottom thereof. It is understood that the conduits 14, 16, 18 may penetrate the inner vessel 20 at other locations as desired. Additionally, each conduit 14, 16, 18 is joined to the inner vessel 20 at the aperture in the inner vessel 20 by a bond 50 therebetween. The bond 50 is typically a welded joint between the inner vessel 20 and the conduit 14, 16, 18, although other bonds can be used as desired. Additional or fewer conduits (not shown) penetrating the storage tank 10 can be provided as desired. The conduits can provide communication between one or more sensors or heaters (not shown) disposed within the storage tank 10 and an electrical source (not shown) remotely located from the storage tank 10. Further, it is also understood that the pathway of the conduits 14, 16, 18 from the outer vessel 22 to the inner vessel 20 may have paths other than the substantially straight path shown in FIG. 1. The other pathways of the conduits 14, 16, 18 can be longer and follow a perimeter of the inner tank, for example, as desired.

The thermal shield 13 includes a metal plate adapted to form a generally u-shaped elongated tube with an open upper end 52 and a closed lower end 54. The thermal shield 13 is bonded to the inner vessel 20 at the closed lower end 54 located near a bottom of the inner vessel 20. The penetration points of the conduit 14, 16, 18 into the inner vessel 20 are encompassed by the thermal shield 13. The thermal shield 13 extends upwardly toward the upper portion of the tank 10 within the interstitial space between the conduits 14, 16, 18 and the outer vessel 22 to form a shielding cavity 56 between the inner vessel 20 and the thermal shield 13.

Figure 3A:
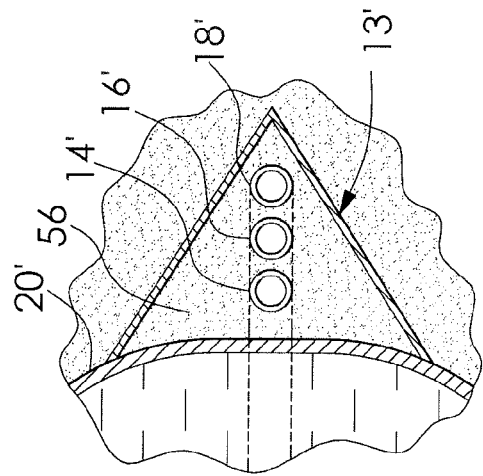
FIG. 3a is an enlarged fragmentary schematic sectional top view of a portion of the cryogenic storage tank shown in FIG. 2 generally depicted by circle 3 and illustrating a thermal shield.
Figure 3B:
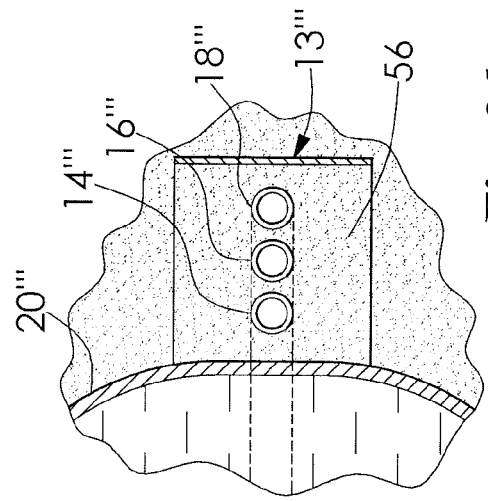
Figure 3C:
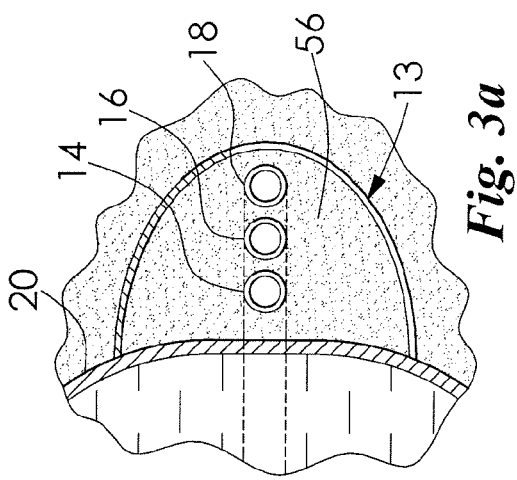
Figure 3D:
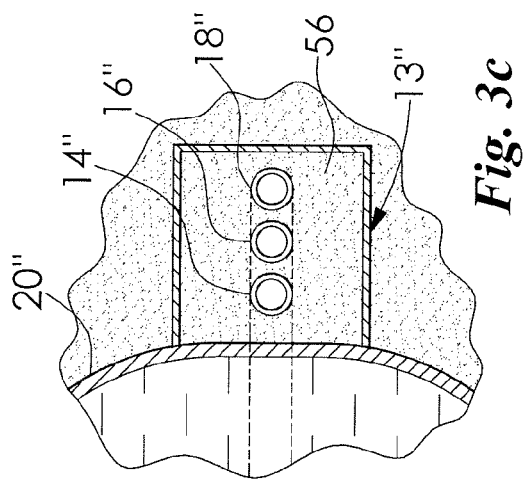

The thermal shield 13 as shown in FIGS. 2 and 3a is generally u-shaped and forms the shielding cavity 56. However, the thermal shield 13 can form differently shaped shielding cavities as desired. Some examples of other shaped shielding cavities are shown in FIGS. 3b, 3c, and 3d although other shapes can be used. Like structure repeated from FIG. 3a includes the same reference numeral and a prime symbol (') in FIG. 3b, a double prime symbol (") in FIG. 3c, and a triple prime symbol ('") in FIG. 3d. FIG. 3b shows a substantially v-shaped thermal shield 13'. FIG. 3c shows a substantially rectangular thermal shield 13". FIG. 3d shows a substantially planar thermal shield 13'". It is understood that the thermal shield 13 can have other shapes to shield the conduits 14, 16, 18 on one or more sides. Further, it is understood that the thermal shield 13 can be adapted to surround a greater or lesser portion of the conduit than shown in FIG. 3d without departing from the scope and spirit of the invention.

During a filling operation, the cryogenic liquid 100 is caused to flow through the second conduit 16 into the reservoir 12 of the storage tank 10. The cryogenic liquid flows through the aperture 40 and through the gas 102 at the top of the storage tank 10 before flooding to the bottom of the storage tank 10. As the cryogenic liquid 100 passes through the gas 102 at the top of the storage tank 10, the gas 102 is cooled. Simultaneously with the cryogenic liquid 100 filling, the gas 102 may be extracted from the storage tank 10 through the first conduit 14 to relieve the pressure in the reservoir 12 and to facilitate a filling of the storage tank 10 with the cryogenic liquid 100.

During an extraction operation, the cryogenic liquid 100 is caused to flow through the aperture 48 of the third conduit 18 and out of the storage tank 10. Simultaneously, if desired, the gas 102 may be caused to flow through the aperture 32 of the first conduit 14 out of the storage tank 10, as desired.

When the storage tank 10 is in use, the distal ends (not shown) of the conduit 14, 16, 18 are generally exposed to the ambient environment and the second portions 28, 36, 44 are in contact with the liquid cryogenic fluid 100. The typical cryogenic liquid is significantly colder than the ambient temperature, for example, hydrogen liquefies at a −253° C. The conduit 14, 16, 18 are a significant source of heat transfer from the ambient environment to the liquid cryogenic fluid 100 due to the significant temperature difference therebetween. The thermal shield 13 minimizes such heat transfer.

The thermal shield 13 is bonded to the inner vessel 20 placing it in thermal contact with the inner vessel 20. The temperature of the thermal shield 13 is maintained at a temperature lower than the conduit 14, 16, 18 due to the low temperature of the cryogenic liquid 100 in the reservoir 12. The conduit 14, 16, 18 are cooled as they pass through the shielding cavity 56 of the thermal shield 13 prior to penetrating the inner vessel 20. The cooling of the conduit 14, 16, 18 minimizes the heat entry into the inner vessel 20 and boil-off of the cryogenic liquid 100. Further, the thermal shield deflects the ambient environment thermal energy from the shielding cavity 56 facilitating the maintenance of the low temperature therein.

The thermal shield 13 facilitates a maximization of the volume of the reservoir 12 of the tank 10. The prior art cryogenic tanks (not shown) typically employ a vacuum tube that extends into the reservoir of the tank. The vacuum tube occupies space within the reservoir that could otherwise be occupied with cryogenic fluid. The substitution of the vacuum tube with the thermal shield 13 maximizes the cryogenic fluid capacity of the reservoir 12.

In the embodiment shown, the thermal shield 13 is provided on an exterior surface of the inner vessel 20 and is not subject to the pressure of the compressed cryogenic fluid 100 contained therein. The metal used for the thermal shield 13 can be thinner than the metal used for the inner vessel 20 since it is not a pressure containing structural member of the storage tank 10. Further, the metal used for the thermal shield 13 does not need to be compatible with hydrogen and the welds bonding the thermal shield 13 to the inner vessel 20 do not need to be vacuum tight. The vacuum tube of the prior art on the other hand, is a member of the pressure containing portion of the tank and requires metal and welds capable of withstanding such pressures and a hydrogen atmosphere. The material costs, production costs, and weight of the storage tank 10 utilizing the thermal shield 13 are minimized.

As described above, the prior art cryogenic tanks typically employ a vacuum tube to cool the conduit that penetrate the tank. The tube is typically sized to accommodate the conduit with limited additional space therebetween. Further, the conduit penetrates the inner vessel at a far end of the vacuum tube. The structure restricts access to the vacuum tube welds and the welds bonding the conduit to the inner vessel once the inner vessel is closed. The structure of the storage tank 10 as illustrated in FIG. 1 provides welds that are accessible from the exterior surface of the inner vessel 20. The inner vessel 20 can be tested for vacuum tightness and the locations of any leaks are readily visible and accessible for repair. The production costs and repair costs of the storage tank 10 utilizing the thermal shield 13 are minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cryogenic fluid storage tank comprising:
   a tank having an inner vessel and a spaced apart outer vessel, the inner vessel adapted to store a cryogenic fluid, wherein an insulation is disposed between the inner vessel and the outer vessel;
   a first conduit penetrating the inner vessel of the tank at a penetration point; and
   a thermal shield disposed between the inner vessel and the outer vessel, the thermal shield coupled to the inner vessel spaced from the penetration point, the first conduit, and the outer vessel to thermally shield the first conduit from ambient temperatures.

2. The storage tank of claim 1, wherein the cryogenic fluid is at least one of hydrogen, oxygen, nitrogen, argon, neon, krypton, xenon, and helium.

3. The storage tank of claim 1, wherein the first conduit is adapted to vent and extract a gas from the tank.

4. The storage tank of claim 3 further comprising a second conduit penetrating the tank, the second conduit adapted to supply the cryogenic fluid to the tank.

5. The storage tank of claim 4 further comprising a third conduit penetrating the tank, the third conduit adapted to extract the cryogenic fluid from the tank.

6. The storage tank of claim 1, wherein the thermal shield is substantially u-shaped in cross section.

7. The storage tank of claim 1, wherein the thermal shield is substantially v-shaped in cross section.

8. The storage tank of claim 1, wherein the thermal shield is substantially rectangular in cross section.

9. The storage tank of claim 1, wherein the thermal shield is substantially planar in cross section.

10. The storage tank of claim 1, wherein the thermal shield includes an open upper end and a closed lower end to form a shielding cavity between the inner vessel and the thermal shield, at least a portion of the first conduit disposed within the shielding cavity.

11. The storage tank of claim 1, wherein the insulation is provided by maintaining a space between the inner vessel and the outer vessel under a vacuum.

12. The storage tank of claim 1, wherein the insulation is multi-layered thermal vacuum insulation.

13. The storage tank of claim 1, wherein the insulation fills a space between the inner vessel and the outer vessel.

14. A cryogenic fluid storage tank comprising:
   a dual wall tank having an inner vessel, an outer vessel, and an interstitial space formed therebetween, the tank adapted to store a cryogenic fluid, wherein an insulation is disposed in the interstitial space formed between the inner vessel and the outer vessel;
   a first conduit penetrating the outer vessel and the inner vessel of the tank; and a thermal shield disposed in the interstitial space and coupled to the inner vessel, the thermal shield spaced from the first conduit and the outer vessel to thermally shield the first conduit.

15. The storage tank of claim 14, wherein the cryogenic fluid is at least one of hydrogen, oxygen, nitrogen, argon, neon, krypton, xenon, and helium.

16. The storage tank of claim 14 further comprising a second conduit penetrating the outer vessel and the inner vessel of the tank, the second conduit adapted to supply the cryogenic fluid to the tank.

17. The storage tank of claim 16 further comprising a third conduit penetrating the outer vessel and the inner vessel of the tank, the third conduit adapted to extract the cryogenic fluid from the tank.

18. The storage tank of claim 14, wherein the thermal shield is one of a substantially u-shaped, substantially v-shaped, substantially rectangular, and substantially planar.

19. The storage tank of claim 14, wherein the thermal shield includes an open upper end and a closed lower end to form a shielding cavity between the inner vessel and the thermal shield, at least a portion of the first conduit disposed within the shielding cavity.

20. A cryogenic fluid storage tank comprising:
an outer vessel;
an inner vessel disposed in the outer vessel forming an interstitial space therebetween, the inner vessel and the outer vessel cooperating to store a cryogenic fluid, wherein an insulation is disposed in the interstitial space formed between the inner vessel and the outer vessel;
a first conduit penetrating the outer vessel and the inner vessel of the tank, the first conduit adapted to vent and extract a gas from the tank;
a second conduit penetrating the outer vessel and the inner vessel of the tank, the second conduit adapted to supply the cryogenic fluid to the tank;
a third conduit penetrating the outer vessel and the inner vessel of the tank, the third conduit adapted to extract the cryogenic fluid from the tank; and
a thermal shield disposed in the interstitial space the first, second, and third conduits and the outer vessel and coupled to the inner vessel, wherein the thermal shield is spaced from the first, second, and third conduits and the outer vessel to thermally shield the first, second, and third conduits.

21. The storage tank of claim 20, wherein the thermal shield is one of a substantially u-shaped, substantially v-shaped, substantially rectangular, and substantially planar in cross section.

22. The storage tank of claim 14, wherein the thermal shield is substantially u-shaped in cross section.

23. The storage tank of claim 20, wherein the thermal shield is substantially u-shaped in cross section.

24. The storage tank of claim 20, wherein the thermal shield includes an open upper end and a closed lower end to form a shielding cavity between the inner vessel and the thermal shield, at least a portion of the first conduit disposed within the shielding cavity.

* * * * *